Figure 1:
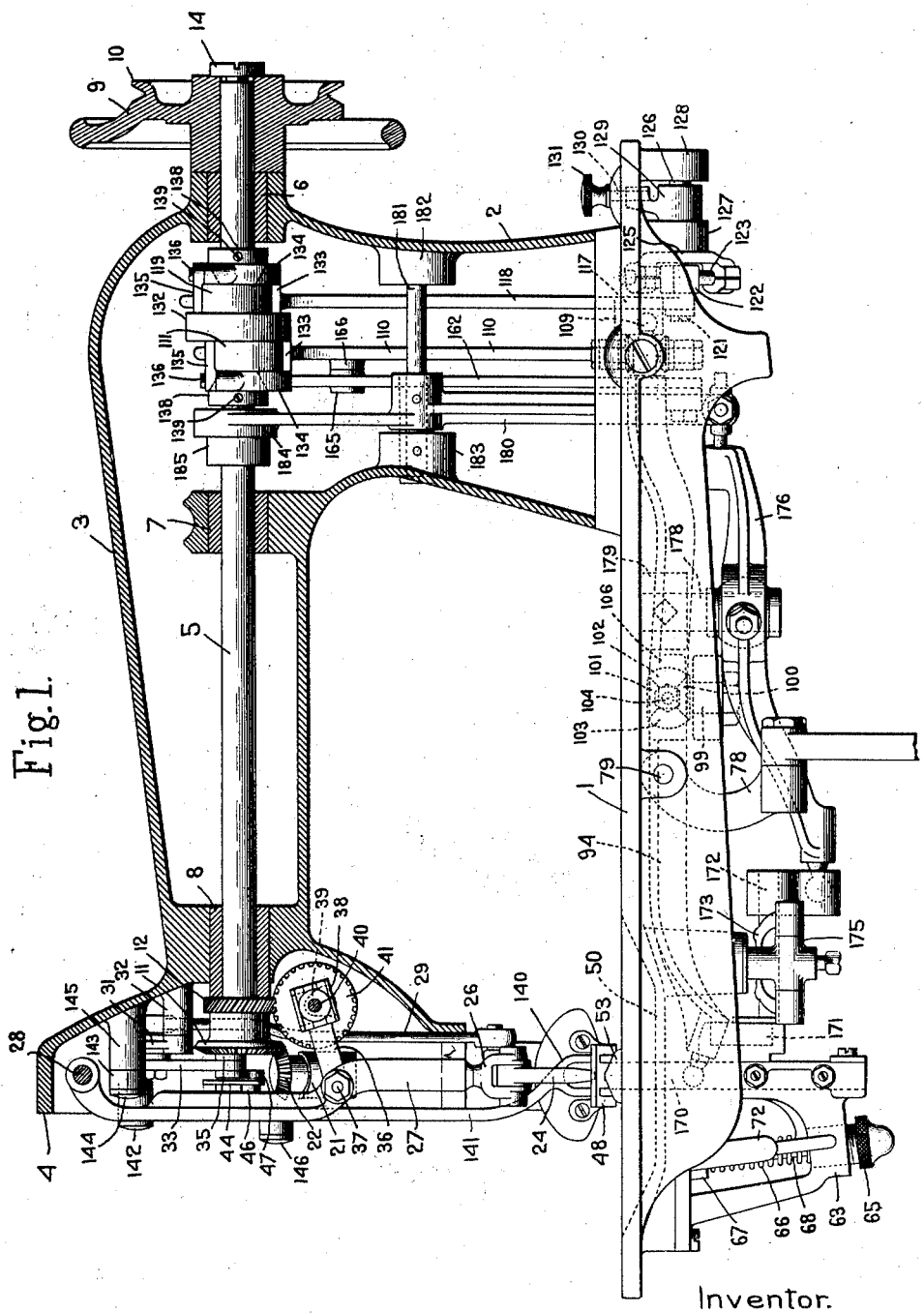

H. C. MOULTON.
WORK PRESENTING MECHANISM FOR BLINDSTITCH SEWING MACHINES.
APPLICATION FILED SEPT. 8, 1915.
1,334,920.
Patented Mar. 23, 1920.
6 SHEETS—SHEET 2.
Fig.2.
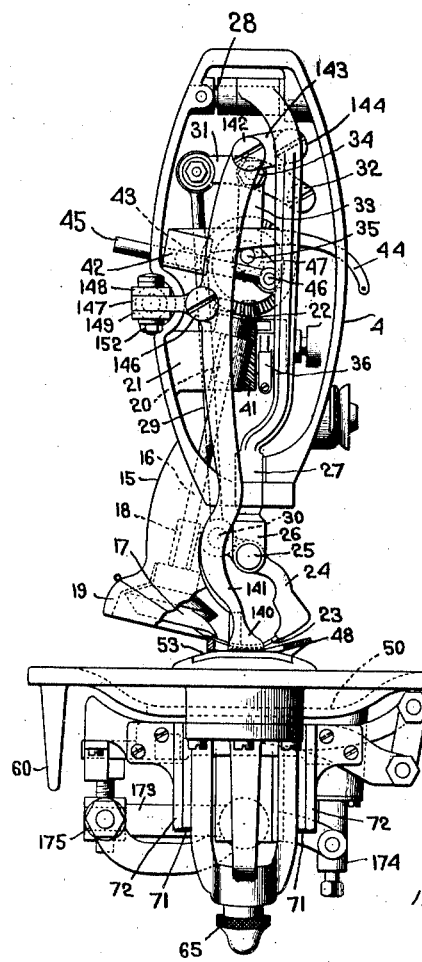
Fig.3.
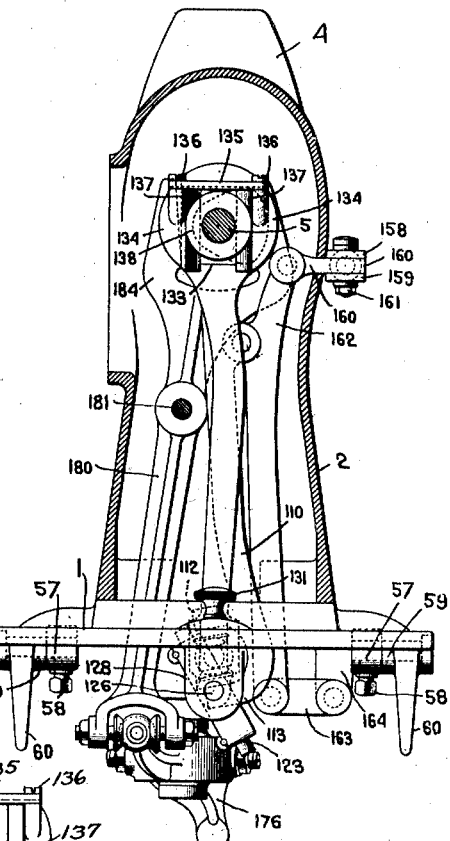
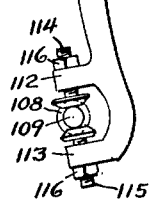
Fig.14.
Inventor.
Harley C. Moulton,
by Heard Smith & Tennant.
Atty's.

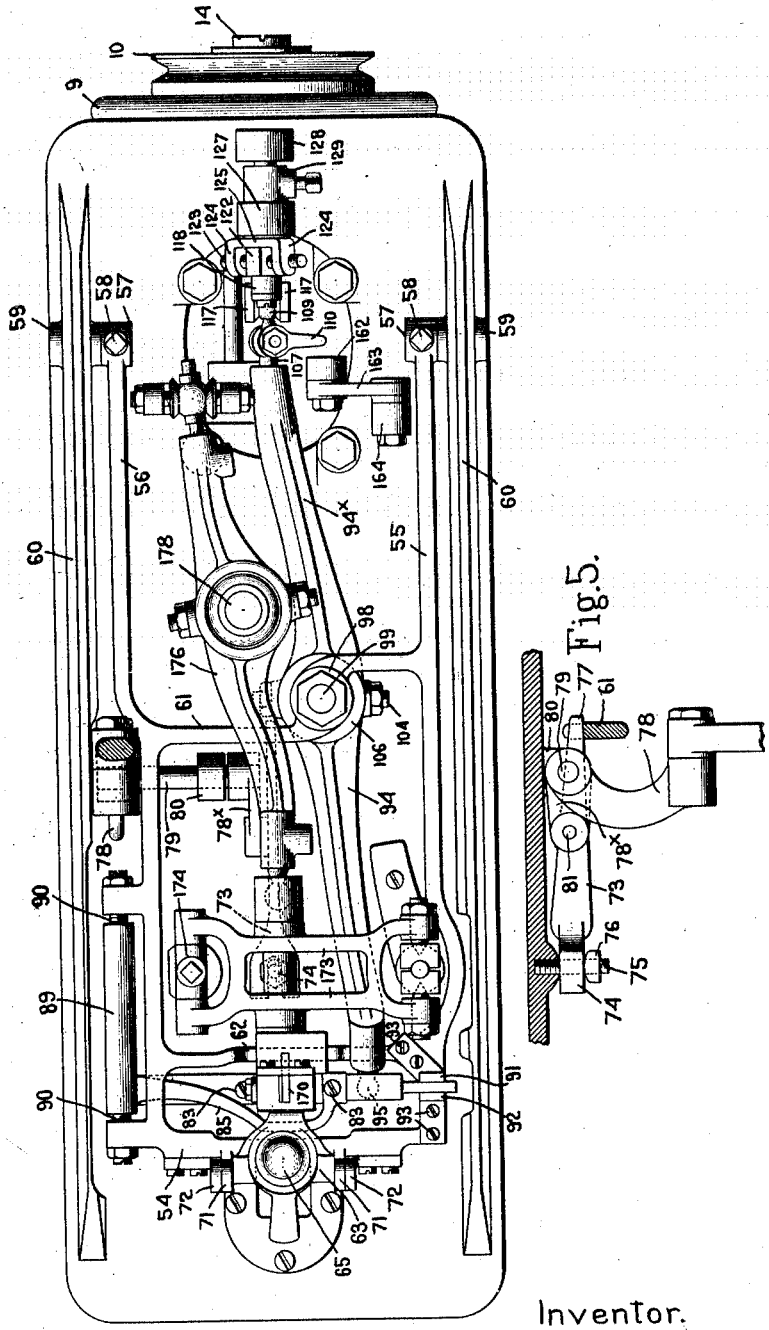

H. C. MOULTON.
WORK PRESENTING MECHANISM FOR BLINDSTITCH SEWING MACHINES.
APPLICATION FILED SEPT. 8, 1915.

1,334,920.

Patented Mar. 23, 1920.
6 SHEETS—SHEET 4.

Inventor.
Harley C. Moulton,
by Heard Smith & Tennant.
Atty's.

H. C. MOULTON.
WORK PRESENTING MECHANISM FOR BLINDSTITCH SEWING MACHINES.
APPLICATION FILED SEPT. 8, 1915.

1,334,920.

Patented Mar. 23, 1920.
6 SHEETS—SHEET 6.

Inventor.
Harley C. Moulton,
by Heard Smith & Tennant.
Att'ys.

UNITED STATES PATENT OFFICE.

HARLEY C. MOULTON, OF DORCHESTER, MASSACHUSETTS, ASSIGNOR TO ARBETTER FELLING MACHINE COMPANY, OF BOSTON, MASSACHUSETTS, A CORPORATION OF MAINE.

WORK-PRESENTING MECHANISM FOR BLINDSTITCH SEWING-MACHINES.

1,334,920.

Specification of Letters Patent. Patented Mar. 23, 1920.

Application filed September 8, 1915. Serial No. 49,623.

*To all whom it may concern:*

Be it known that I, HARLEY C. MOULTON, a citizen of the United States, and resident of Dorchester, county of Suffolk, State of Massachusetts, have invented an Improvement in Work-Presenting Mechanism for Blindstitch Sewing-Machines, of which the following description, in connection with the accompanying drawing, is a specification, like characters on the drawing representing like parts.

This invention relates to improvements in work presenting mechanism for sewing machines and is particularly adapted for use in connection with blind stitch sewing machines for padding, felling and the like.

One of the objects of the invention is to provide means by which the work may be laid flat upon the table as it is presented to the stitch forming mechanism, the mechanism for presenting the work to the needle and for advancing the same being adapted to be moved into contact with the work after the same is properly positioned in respect to the needle.

In machines adapted to sew a superimposed layer upon a base layer it is particularly desirable that means shall be provided for advancing the base and superimposed layer with absolute uniformity and another object of the invention is to provide a feeding mechanism in which the upper and lower feeds are actuated in absolute synchronism and in which a single common adjustment will always maintain said feeds in proper coöperative relation notwithstanding the amplitude of movement of the feed dog.

This is accomplished in the present invention by providing a single means for simultaneously adjusting the throw of both the upper and lower feeds, these feeds being actuated by the same cams or other motion imparting device.

Another object of the invention is to provide a novel and accurate adjustment for the extent of vertical movement of the lower feed dog.

Other features of the invention include various novel forms of mechanism for connecting the relatively movable parts of the work presenting mechanism including means whereby wear is minimized and novel adjusting mechanism provided compensating for such wear as may occur.

Other objects and features of the invention will more fully and at length appear in the following description and the accompanying drawings and will be pointed out in the annexed claims.

The improved feeding mechanism is illustrated herein as applied to a blind stitch machine especially adapted for feeding and like uses.

Figure 6:
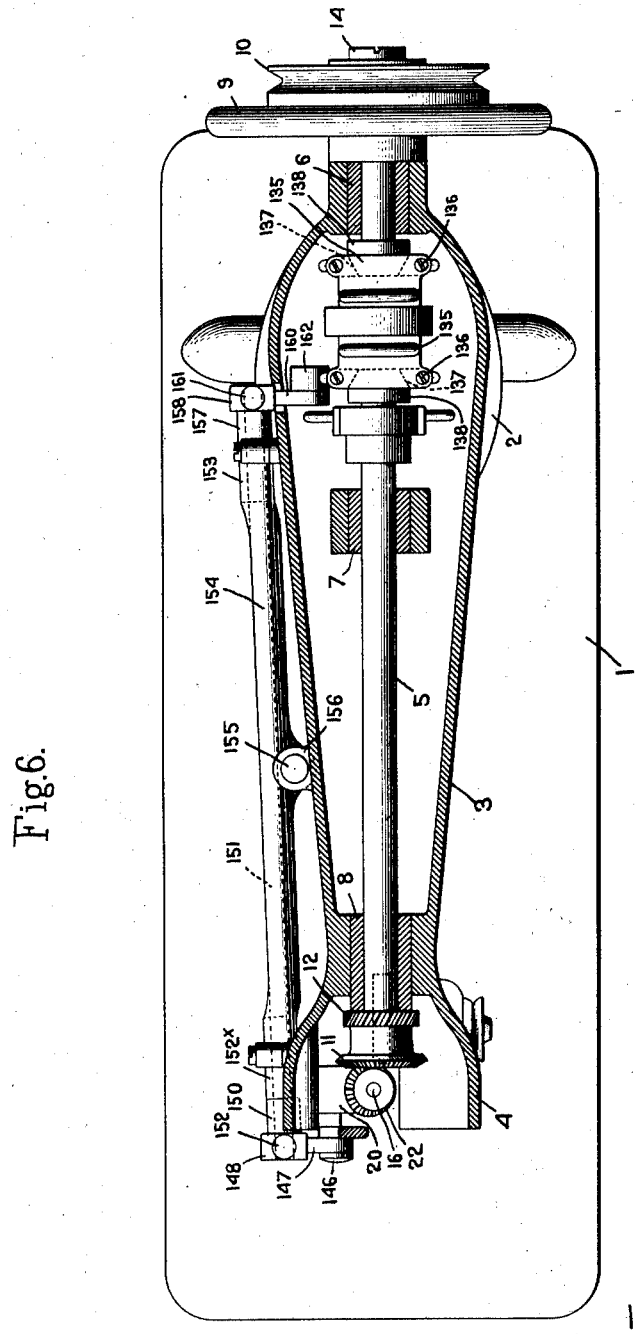
Figure 7:
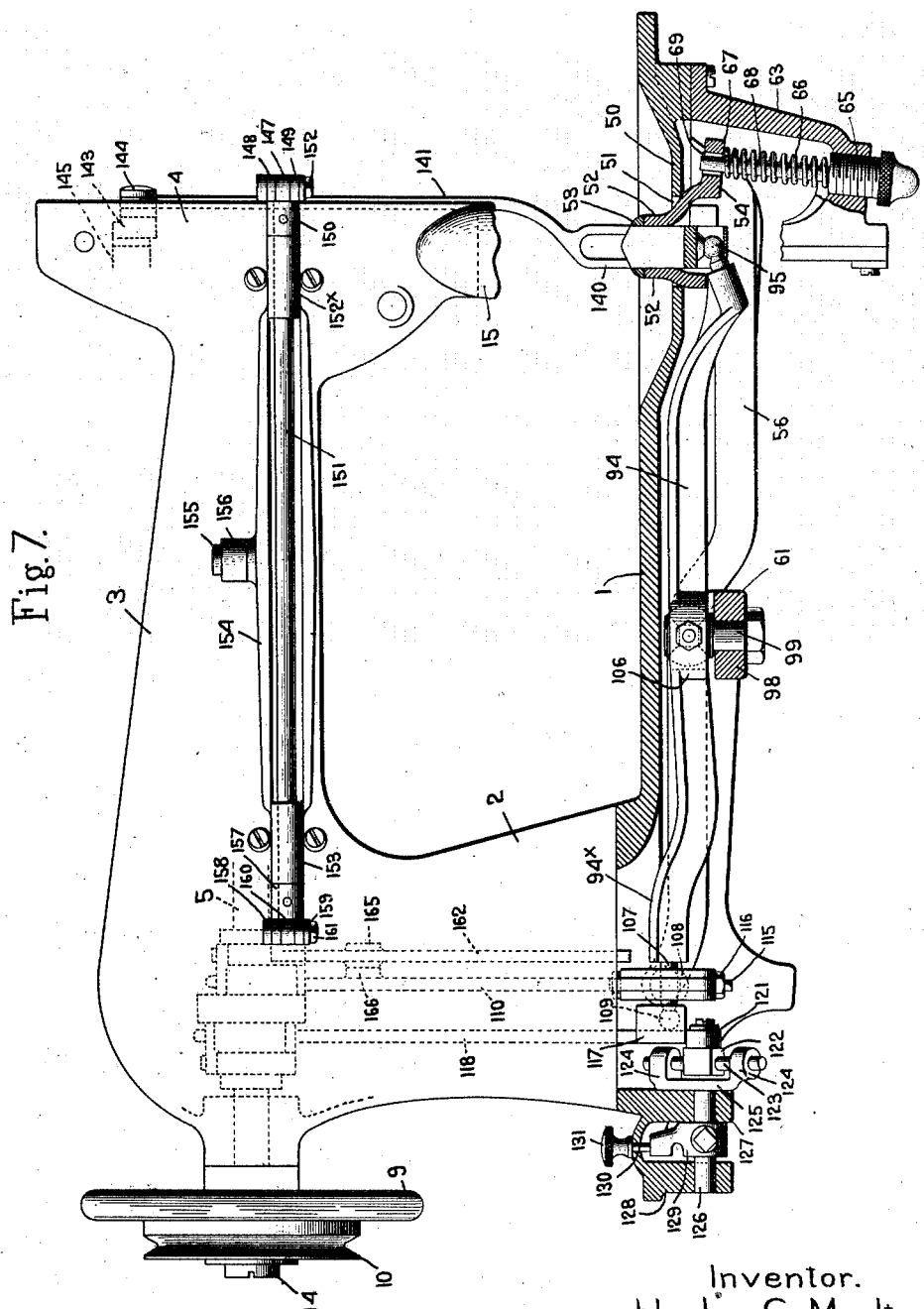
Figure 8:
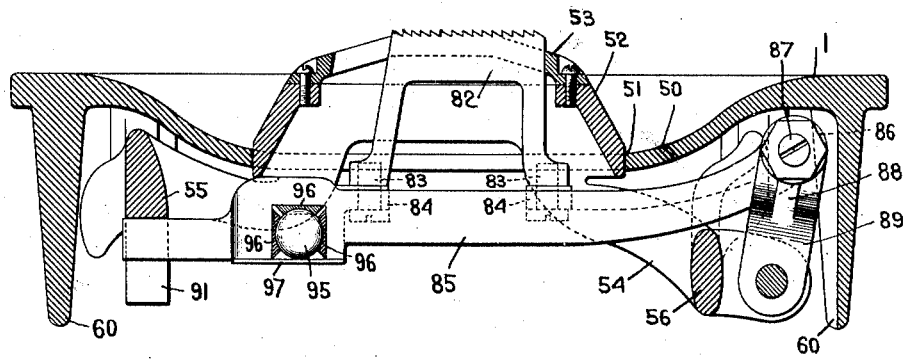
Figure 9:
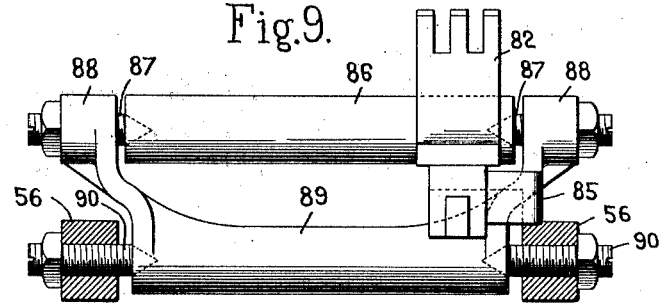
Figure 10:
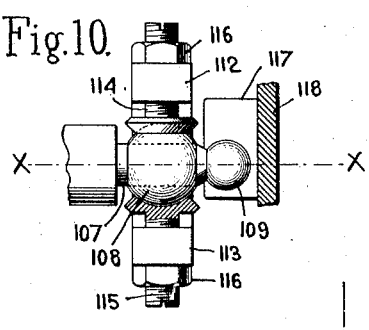
Figure 11:
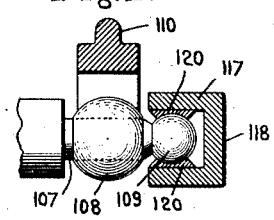
Figure 12:
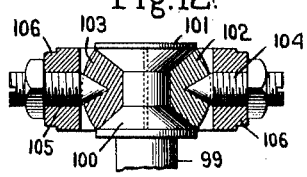
Figure 13:
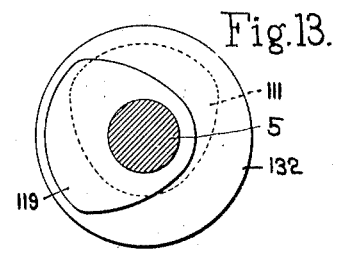

In the drawings, Figure 1 is a front elevation of a sewing machine embodying my invention, the arm of the machine being shown in vertical section, Fig. 2 is an end view of the head of the machine, the face plate having been removed, Fig. 3 is a rear end elevation of the machine, the standard being shown in section to disclose the feed actuating mechanism, Fig. 4 is an underneath plan view of the machine, Fig. 5 is a detail view of the mechanism for raising and lowering the work presenting mechanism relatively to the bed plate, a portion of which is shown in section, Fig. 6 is a horizontal sectional view through the arm of the machine, showing the main shaft and mechanisms connected therewith in elevation, Fig. 7 is a rear elevation of the machine, showing parts of the feeding mechanism in section, Fig. 8 is a detail sectional view through the work support and bed plate, illustrating the mechanism for supporting the feed dog and work support, Fig. 9 is a detail view of the feed dog and the mechanism for pivotally supporting the same to permit vertical and longitudinal movements thereof, Fig. 10 is a detail view in side elevation and partly in section, of the ball connection for transmitting motion from a vertical cam-actuated lever for the feeding mechanism to a horizontal oscillating transmitting lever, Fig. 11 is a horizontal sectional view on line x—x Fig. 10 showing the end of the feed dog actuating lever and balls in elevation, Fig. 12 is a detail view partially in section of the pivotal support for the feed dog actuating lever, and, Fig. 13 is a detail view of the cams on the main shaft which impart up and down and forward and backward movement to the feed dog, Fig. 14 is a detail view of the lever through which both the upper and lower feed dogs are actuated.

The sewing machine as illustrated herein has the usual bed plate 1 with the standard 2 extending upwardly from the rear end of the same and the forwardly extending arm 3 terminating in a head 4 as is usual in sewing machine constructions. The main shaft 5 is journaled in suitable alined bearings having bushings 6, 7 and 8 in the arm and is provided at its rear end with a hand wheel 9 and driving pulley 10. A beveled gear 11 and a spiral gear 12 are secured to the opposite rotary hoop, the work gear serving to actuate mechanism for shogging the needle.

In order to facilitate the assembling of the machine and to maintain the mechanisms actuated by the shaft in proper relation the worm wheel 12 abuts against the end of the bushing 8 and the shaft is provided at its opposite end with a screw 14 having a large head which engages the hub of the hand wheel and pulley and is adapted to force the same against the bushing 6 and its bearing. By this construction less accuracy is required in forming the parts and the shafts may be assembled in the head with greater accuracy and more readily than in the usual construction.

The head of the machine as illustrated herein is provided with an integral downward extension 15 forming a hook bracket in which a shaft 16 for actuating a rotary hook 17 is journaled, suitable bearings 18 being provided for said shaft. A cover plate 19 may be conveniently hinged to the side of the hook bracket so that the bobbin can be readily removed from the hook. The shaft 16 at its upper end is journaled in a bearing 20 in a lug or bracket 21 projecting from the inner surface of the head, the hook shaft 16 being driven through a beveled gear 22 at its upper end which meshes with the beveled gear 11 on the main shaft.

The preferred form of needle mechanism disclosed herein is of a novel and simplified construction. The curved needle 23 is supported in a needle bar 24 which is pivoted in a stud 25 extending across the arms of a bracket 26 which may be adjustably mounted in the end of a supporting lever 27 which desirably is pivoted at its upper end upon a short shaft 28 extending across the upper end of the head of the machine. The needle bar 24 and needle 23 are oscillated through a link 29 connected at its lower end to a stud 30 on the end of the needle bar 24 and at its upper end to one end of a lever 31 which is pivoted upon a stud 32 in the head and is actuated through a link 33 connected at one end to a stud 34 on the lever 31 preferably about midway of its ends and at the other end to a pin or stud 35 mounted upon the end of the main shaft. The lateral or shogging movement is imparted to the needle through a link 36 which is connected at one end to a stud 37 on the lever 27 and at its opposite end to a member 38 which engages a cam 39 secured upon a cross shaft 40 which is rotated by a spiral gear 41 which meshes with the gear 12 on the main shaft.

As illustrated herein the gears which actuate the needle and revolving hook are so proportioned that the hook is rotated twice for each oscillation of the needle and the needle is vibrated laterally upon every alternate oscillation.

Any suitable take-up mechanism may be utilized with the needle mechanism herein described, a preferred form however is illustrated herein which comprises a block 42 pivotally mounted upon a stud 43 extending into a boss on the machine, the take-up arm 44 being integral with the block and extending beyond the head of the machine a sufficient distance to coöperate properly with the tension and needle mechanism. The block 42 is provided with an aperture at right angles to and in the same axial plane with the stud 43 and a sliding rod 45 mounted in said aperture and connected to a stud 46 at the end of an arm 47 projecting from the stud to which the needle actuating link 33 is connected serves to impart the proper movements to the take-up arm.

Any desired form of presser foot 48 may be secured to or supported by the integral downwardly extending hooked bracket as is usual in machines of this type.

The work-presenting mechanism to which this application is particularly addressed comprises a depressible work support carried upon a frame pivotally supported on and depending from the bed plate of the machine, the work support extending through a depressed portion of the bed plate, thus permitting the work to be introduced in flat condition. The lower feeding mechanism and the bender mechanism are carried upon the pivoted frame of the work support and are actuated through simplified mechanisms driven from cams on the main shaft of the machine.

The feeding mechanism includes an upper and a lower feed dog with mechanism for actuating them in synchronism. An adjusting mechanism is provided which is adapted to vary the throw of the upper and lower feed dogs simultaneously and coextensively throughout to suit the character of stitching which is being performed. Either the upper or lower feed mechanism may be disconnected or the other utilized alone as a means for feeding the work.

As illustrated in the drawings the bed of the machine is provided with a depressed portion 50 of considerable area which has a substantially central aperture 51 through which the work support 52 is adapted to project. A plate 53 adjustably secured to the upper end of the work support and the feed dog may desirably be in the form of an arch as illustrated in Figs. 7 and 8 which will serve to raise the work at the line of stitching a short distance above the plane of the bed plate. By reason of this construction the arched work supporting surface when in normal position projects above the plane of the bed plate and serves to bend the work upwardly at the line of feed so that the curved oscillating laterally vibrating needle will enter the material on opposite sides of the vertical median plane of the work support. By thus bending the work upwardly at the line of feed the needle enters more readily between the superimposed and base layer when felling is being performed and a better penetration of the needle into the fabric is also obtained when the machine is used in padding. The work support 52 may be an integral portion of the end 54 of a frame comprising side members 55 and 56 extending rearwardly and provided at their rear ends with bosses 57 secured by screws 58 to studs projecting into suitable bosses 59 in flanges or webs 60 depending from the under side of the main frame adjacent the longitudinal edges thereof. The frame 56 may conveniently be provided with transverse webs 61—62 adapted to support the actuating mechanisms for the feed dog.

The outer end of the work support is yieldably supported from a bracket 63 secured to the under face of the main frame and provided with an adjusting screw 65 carrying a helical spring 66 which engages the under surface of an extension 67 of said pivoted frame. The screw 65 may conveniently be provided with a guiding stud 68 extending upwardly through an aperture 69 in the end portion of the frame extension 67.

As illustrated herein the base of the bracket 65 is substantially circular in form and the bracket is formed of three substantially equally spaced depending webs which are somewhat inclined to the plane of the bed plate to give more room for the work presenting mechanism. The bracket is also provided with a rearwardly extending portion 70 which is provided with guides 71 adapted to coöperate with complementary guides 72 upon the pivoted frame of the work support so that the work support will always be raised and lowered vertically.

Any suitable mechanism may be utilized for depressing the pivoted frame which carries the work support and lower feeding mechanism which will hereinafter be described, for the purpose of permitting the insertion and removal of the work.

As illustrated herein the means for depressing the work support consists of a lever 73 having a forked end 74 embracing a bolt or stud 75 provided with a nut 76 having a crowned face, the opposite end 77 of the lever 73 resting in a notch in the transverse web 61 of the pivoted frame. The lever 73 is actuated through a knee lever 78 of the usual form which is pivoted upon a shaft 79 carried by lugs or ears 80 depending from the under surface of the bed plate. The lever 78 is of bell crank form and its opposite end 78$^x$ is pivotally connected to a stud 81 preferably about midway of the lever 73.

The lower feed dog may, as illustrated herein, be in the form of an inverted U-shaped member 82 serrated at its upper face and having its legs secured by bolts 83 to suitable lugs 84 upon a feed dog supporting lever 85.

In order to provide for the vertical and longitudinal movements of the feed dog, the feed dog supporting lever, as illustrated herein, is supported upon a pivotally mounted frame at one end and is slidably mounted at the other in ways depending from the pivoted frame of the work support.

The feed dog supporting lever is provided at one end with a cylindrical member 86 which is mounted upon screws 87 having conical points extending into suitable recesses in the member 86, said screws being carried by the arms 88 of a yoke 89 the intermediate portion of which is mounted upon similar conical ended screws 90 carried in lugs on the member 56 of the pivoted frame of the work support. The opposite end of the feed dog supporting lever is guided between L-shaped guides 91, 92 which are preferably secured to the under surface of the pivoted frame by screws 93 passing through slots in the guide plates 91, 92.

The up and down and forward and backward motions are all imparted to the feed dog supporting lever 85 through a single lever 94 which is connected to the feed dog supporting lever, preferably adjacent its guided end, by a universal joint. This universal joint connection comprises a ball 95 upon the end of the lever which engages the concaved face of preferably three or if desired four gibs 96, these gibs being slidably mounted in a rectangular aperture in an enlarged portion of the feed dog supporting lever 85. As illustrated herein but three of these gibs are shown, the ball being held within the recess by a cover plate 97 which overlies the recess and engages said ball. The lever 94 is pivoted at about its middle upon a ball joint whereby the lever is permitted to have a universal movement. The ball joint, which is illustrated in detail in Fig. 12 is constructed as follows: The web 61 of the frame is provided with an enlarged portion 98 to which is secured a vertical stud 99 having at its upper end flanges formed with oppositely disposed conical faces 100 and 101. A split ball conically bored axially to correspond to the conical faces is mounted upon the stud intermediate of said face, the hemispherical portions 102 and 103 being pivotally mounted upon an axis at right angles to the axis of the stud upon conically pointed screws 104, 105, carried by the wall 106 of an enlarged portion at the center of the lever 94. A compound movement is given to the ends 94$^x$ of the lever 94 which will transmit to the feed dog forward and backward and up and down movement through the following instrumentalities.

The end 94$^x$ of the lever is provided with a longitudinally extending stud 107 which has upon it two balls, a large ball 108 engaged by the mechanism which imparts vertically reciprocating movement to the lever and a smaller ball 109 which is guided in ways with an adjustably actuated lever to impart forward and backward movement to the feed dog.

The up and down movement of the feed dog is imparted through a lever 110 which is actuated from a cam 111 upon the main shaft and is provided at its lower end with a laterally extending fork comprising arms 112 and 113. Bolts 114, 115 in axial alinement, passing through the arms 112 and 113 are provided with concaved faces adapted to engage the surface of the ball 108, said bolts being adjustable to raise and lower the end 94$^x$ of the feed dog actuating lever and thereby to adjust the height of the feed dog relatively to the work supporting surface of the work support. These bolts 114 and 115 may be locked in adjusted position by suitable set nuts 116.

A backward and forward movement of the feed dog is imparted through the engagement of the ball 109 with an inclined way 117 formed in a lever 118 which likewise is reciprocated by a cam 119 on the main shaft. In order to reduce the friction between the ball and its guideway, and to provide a universal connection, the ball is seated in spherically concaved gibs 120 which are slidably mounted in the guideway 117.

The lower end of the lever 118 is pivotally connected by a stud 121 to a sliding cross head 122 which is provided with a rigidly connected rod 123 which is slidably mounted in bosses 124 in the ends of a yoke 125, which in turn is pivotally mounted upon a stud shaft 126 journaled in a bearing 127 in a depending web from the base plate and in a supplemental bracket 128 which may be made integral with the bed plate.

An arm 129 is rigidly secured to the stud shaft 126 and is provided at its end with an adjusting screw 130 extending through an arcuate guide in the bed plate 1, said screw 130 being adapted to be held in adjusted positions by means of a milled nut 131 adapted to be clamped upon a curved surface of the guide.

By adjusting the position of the arm 129 through the screw 130 and nut 131 the angular inclination of the shaft 123 to the vertical will be adjusted and consequently as the lever 118 is reciprocated its lower end and that of the guide 117 will be given a lateral movement in proportion to the angular adjustment of the rod 123 so that a greater or less forward and backward movement will be given to the feed dog.

In order to provide for the accurate reciprocation of the levers 110 and 118 I have provided a novel form of cam mechanism which is applied to each of these levers and the description of one will serve as a description for both.

The cams for operating the levers 110 and 118 may be formed upon the main shaft 5 but preferably are constructed separately therefrom and secured thereto. As illustrated herein these cams are formed upon an integral block having a central cylindrical portion 132 which is bored concentrically to receive the axis of the shaft, the cam 111 projecting from one side and the cam 119 from the other side of the cylindrical portion, said cams being disposed in the manner illustrated in Fig. 13 in which the cam 119 for imparting horizontal motion to the feed dog is shown in full lines and the cam 111 which imparts up and down movement to the feed dog in dotted lines.

In order to provide for the pivotal and reciprocatory movement about the axis of the shaft 5 a novel connection between the levers and the cam strap has been devised which is constructed as follows:

Each of the levers is provided at its upper end with a head 133 adapted to engage the underside of the cam. This head extends laterally and is provided with a forked portion or yoke 134 which extends above the head of the cam and a cover plate 135 is secured thereto by screws 136. In its rotation the cam by contact with the head 133 and the cover plate 135 imparts vertical movement to the lever.

In order to provide for adjustment for wear and also to permit the levers to oscillate properly about the axis of the shaft 5 the inner faces of the yoke 134 are provided with parallel beveled surfaces 137 which are engaged by a cone 138 which is adjustably mounted upon the shaft 5, being secured thereon preferably by set screws 139.

By tightening the cover plate 135 and moving the cones 138 toward each other upon the shaft all the wear between the relatively movable surfaces of this part of the feed actuating mechanism can be readily compensated for. As before stated it is desirable in blind stitch sewing machines that an upper feed be provided which shall be actuated simultaneously with the lower feed and will be extensive in longitudinal movement.

In order to maintain these relations mechanism has been produced by which both feeds are actuated from the same motion imparting instrumentalities, such instrumentalities as illustrated herein being the cams 111 and 119 on the main shaft and the levers 110 and 118 which are actuated respectively by said cams. A single adjusting mechanism for varying the amplitude of movement of the feed dogs is provided which operates upon the lever 118 and thereby controls the forward and backward movement of both the upper and the lower feed so that these feed dogs are adjusted simultaneously and equally, thus preserving at all times the proper coöperation between said dogs.

The upper feed dog 140 as illustrated herein is bifurcated to engage the work upon opposite sides of the paths of the needle and may be formed upon the end of an arm or lever 141 which is pivotally secured at its upper end to a stud 142 upon the end of a link 143 which is pivoted upon a stud 144 projecting from a boss 145 in the upper end of the head of the machine. This connection is such as to permit the vertical and lateral movement of the feed dog. Such movements are imparted to it through an oscillating rod mounted in a lever which is pivoted at substantially its central portion to permit lateral vibration, the rod being connected to the actuating mechanism in such a manner as to have an oscillatory movement upon its axis and a vibratory or reciprocating movement upon its pivotal support.

The lever 141 is connected by a stud or screw 146 to a link 147 which is embraced by extensions 148—149 in a collar 150 which is rigidly secured upon the end of a rock shaft 151, the link 147 being pivotally mounted between the extensions 148—149 upon a bolt 152.

The rock shaft 151 is journaled near its ends in bearings 152ˣ, 153 in the ends of a lever 154 said lever being provided with a stud 155 pivotally mounted in a lug 156 extending laterally from the rear side of the arm of the machine. At its opposite end the rock shaft 151 is provided with a collar 157, similar to the collar 150, which is rigidly secured to said rock shaft and is provided with extensions 158 and 159 between which the end of the link 160 is pivotally mounted upon a bolt 161. The opposite end of the link 160 is pivotally connected to the opposite end of a lever 162 which is pivotally connected at its lower end to the end of a link 163 which link is pivotally connected at its opposite end to a bracket 164 depending from the under surface of the base plate. The link 162 is provided, at a distance below its upper end sufficient to give proper movement to the feed dog, with a lateral extension or boss 165 which is pivotally connected to a corresponding boss 166 on the lever 110. In the operation of the machine the lever 110 is given a vertical movement by its cam 111 and a lateral movement through the action of the cross head 122 through the sliding universal connection 117 to the lever 94ˣ. It therefore follows that the boss 166 which forms the pivotal connection to the lever 162 will have a corresponding compound movement and will cause the rock shaft 151 to be oscillated upon its axis and also to be reciprocated or vibrated laterally about the pivotal axis 155 of its supporting lever 154, thus imparting through the link 147 which is connected to the upper feed dog arm both an up and a down, and a back and forth movement.

The upper feed dog is given substantially the same movement as the lower feed dog but in reverse direction in so far as the up and down movement is concerned it being understood that the links and the lever connections are so proportioned as to give the same amplitude of backward and forward movement to the feed dogs. By reason of this connection the adjustment of the lateral movement of the cross head upon the lever 118 will adjust the extent of forward and backward movement of the upper feed dog to the same extent as it adjusts the movement of the lower feed dog, thus maintaining at all times the proper coöperative relation between the upper and lower feed dogs.

Any suitable bender mechanism may be provided to coöperate with the other members of the work presenting mechanism. I have however devised a novel form of bender mechanism of a simplified character which is conveniently assembled with the other work presenting instrumentalities above described.

This bender mechanism forms the subject matter of a companion application Ser. No. 49,621, filed Sept. 8, 1915, and need not therefore be specifically described herein. It may however be stated that it comprises a vertically reciprocating bender 170 which is actuated by a cam 171 through a rock shaft 172 carried by a lever 173 which is yieldably supported at one end upon a stud 174 and is pivotally and adjustably supported at its opposite end upon a member 175, said rock shaft being actuated through a lever 176 which is universally and slidably pivoted upon a stud 178 depending from a boss 179 which extends downwardly from the under surface of the bed plate.

The lever 176 is actuated through a universal joint connection, similar in character to the connection between the lever 110 and the feed actuating lever 94, from a lever 180 which is pivoted upon a cross shaft 181 supported in bearings in bosses 182—183 upon opposite sides of the inner face of the standard, the upper end of said lever 180 being provided with a yoke 184 which embraces a cam 185 upon the main shaft.

By this mechanism a properly timed movement is imparted to the bender to raise and lower the same in synchronism with the action of the feeding mechanism and stitch forming mechanism so that a portion of the work is elevated in the path of the needle for the formation of each stitch in padding machines of the character illustrated herein.

It will be understood however that suitable mechanism may be introduced to provide for the raising and lowering of the bender upon each alternate stitch or at such periods as may be desirable if the machine is to be used for felling and like purposes.

While the invention has been described herein as embodied in a padding machine it will be understood that it is equally applicable to other types of sewing machines and that the feeding mechanism forming the main portion of the subject matter of this application may be applied not only to blind stitching machines but other sewing machines of almost any type.

It will also be understood that various modifications of the mechanisms herein described may be made within the scope and meaning of the claims hereto annexed.

Having thus described my invention what I claim as new and desire to secure by Letters Patent is;

1. In a sewing machine comprising a bed plate, a needle and complemental stitch forming mechanism located above the bed plate and means for actuating the same; a frame pivotally mounted beneath the bed plate, a work support rigid with the free end of the portion of said frame extending through said bed plate and means for raising the free end of said frame to position the work support in coöperative relation to the complemental stitch forming mechanism and means for depressing the same.

2. In a sewing machine comprising a bed plate, a needle and complemental stitch forming mechanism located above the bed plate and means for actuating the same; a frame pivotally mounted at one end beneath said bed plate, a work support rigid with the free end of said frame extending through said bed plate into coöperative relation with the stitch forming mechanism, yieldable means for supporting the free end of said frame and means for depressing said free end whereby the work support will be removed from coöperative relation to the needle.

3. In a sewing machine having a curved oscillating needle and complementary stitch forming mechanism located above the bed plate; a frame pivotally mounted beneath said bed plate, means for yieldably supporting said frame, a work support and a feed dog carried by said frame, a feed dog actuating lever mounted upon said frame connected to said feed dog and means for actuating said lever to impart both an up and down and a forward and backward movement to said lever.

4. In a sewing machine having a curved oscillating needle and complementary stitch forming mechanism located above the bed plate; a frame pivotally mounted beneath said bed plate, means for yieldably supporting said frame, a work support and a feed dog carried by the free end of said frame, a feed dog actuating lever having a universal pivotal connection to said frame and connected to said feed dog by a universal joint, means for actuating said lever to impart an up and down and forward and backward movement thereto and means for raising and lowering said frame.

5. In a sewing machine having a head, a curved oscillating needle and complemental stitch forming mechanism supported thereby and means for actuating the same; a bed plate having a depression within the area of its surface beneath said stitch forming mechanism, a work support yieldably supported and projecting through a recess in said depression and means for lowering said work support below the plane of the surface of said bed plate to permit the work to be inserted in a flat position.

6. In a sewing machine having a head, a curved oscillating needle and complemental stitch forming mechanism supported thereby and means for actuating the same; a bed plate having a depression within the area of its surface beneath said stitch forming mechanism, work presenting mechanism projecting through an aperture in the depressed portion of said bed plate including a work support, a feed dog and a bender, means for actuating said work presenting mechanism and means for depressing the work presenting mechanism below the surface of said bed plate to permit the insertion of the work.

7. In a sewing machine having a head, a curved oscillating needle and complemental stitch forming mechanism supported thereby and means for actuating the same; a bed plate having a depression beneath said stitch forming mechanism, a work support yieldably mounted in said depression and means for lowering the work support below the plane of the surface of said bed plate to permit the work to be presented in a flat position to the stitch forming mechanism.

8. In a sewing machine having a head, a curved oscillating needle and complemental stitch forming mechanism supported thereby and means for actuating the same; a bed plate having a depression beneath said stitch forming mechanism, a frame pivotally mounted at one end beneath said bed plate and at its other end carrying a work support extending through said depression into coöperative relation with said stitch forming mechanism, feeding mechanism upon said frame, means for actuating said feeding mechanism and means for lowering the work support beneath the plane of the surface of said bed plate to permit the work to be presented in flat position to the stitch forming mechanism.

9. Feeding mechanism for sewing machines including a feed dog, a feed dog actuating lever pivotally mounted upon a universal support and connected to said feed dog by a universal joint, a cam actuated lever adapted to raise and lower said feed dog connected to the opposite end of the feed dog actuating lever by a universal connection, means for adjusting said universal connection to regulate the height of movement of said feed dog and means to impart forward and backward movement to said feed dog actuating lever.

10. Feeding mechanism for sewing machines including a feed dog, a feed dog actuating lever pivoted upon a universal support and connected to said feed dog by a universal joint, a reciprocating and oscillating member connected to the opposite end of said lever by a sliding universal connection and means for raising and lowering said feed dog.

11. Feeding mechanism for sewing machines including a feed dog, a feed dog actuating lever pivoted upon a universal support and connected to said feed dog by a universal joint, a reciprocating and oscillating member connected to the opposite end of said lever by an adjustable sliding universal connection and means for raising and lowering said feed dog.

12. Feeding mechanism for sewing machines including a feed dog, a feed dog actuating lever pivoted upon a universal support and connected to said feed dog by a universal joint, a reciprocating and oscillating member connected to the opposite end of said lever by an adjustable sliding universal connection and means for raising and lowering said feed dog including a reciprocating member connected by a universal connection to said feed dog actuating lever.

13. Feeding mechanism for sewing machines including a feed dog, a feed dog actuating lever pivotally mounted upon a universal support and connected to said feed dog by a universal joint, a reciprocating and oscillating lever connected to the opposite end of said feed dog actuating lever by a sliding universal connection said reciprocating lever having a cross head pivotally attached thereto, a guide for said cross head, means for adjusting said guide to vary the amplitude of movement of said lever and means for vibrating said feed dog actuating lever vertically to raise and lower said feed dog.

14. Feeding mechanism for sewing machines having a bed plate and an overhanging arm, comprising an upper feed dog and means for actuating the same including a rock shaft pivotally mounted upon said arm to vibrate in a horizontal plane, an arm on said rock shaft connected to said upper feed dog and means for rocking and vibrating said rock shaft to impart both up and down and forward and backward movements to said feed dog.

15. Feeding mechanism for sewing machines having a bed plate and an overhanging arm, comprising an upper feed dog, a lower feed dog, a rock shaft extending longitudinally of said overhanging arm and pivotally mounted thereon to vibrate in a horizontal plane, an arm on said rock shaft connected to said upper feed dog and common instrumentalities for actuating said lower feed dog and for rocking and vibrating said rock shaft to impart both up and down and forward and backward movements to said feed dogs whereby synchronism in timing and equality in forward and backward movements of said upper and lower feed dogs will be maintained.

16. Feeding mechanism for sewing machines having a bed plate, an overhanging arm and a main shaft mounted thereon comprising an upper feed dog and a lower feed dog, a lever pivotally mounted upon a universal joint connected to said lower feed dog, a rock shaft extending longitudinally of said overhanging arm pivotally mounted thereon to vibrate in a horizontal plane, an arm on said rock shaft connected to said upper feed dog and a lever actuated from the main shaft of the machine connected to the lever for actuating the lower feed dog and also to said rock shaft adapted simultaneously to impart to the upper and lower feed dogs synchronized up and down and backward and forward movements.

17. Feeding mechanisms for sewing machines comprising a main shaft provided with a plurality of cams, an upper and a lower feed dog, a lever connected to said lower feed dog by a universal connection, a rock shaft connected to said upper feed dog and levers actuated by the cams upon the main shaft connected to said lower feed dog actuating lever and to said rock shaft to impart up and down and forward and backward movements to said feed dogs.

18. Feeding mechanism for sewing machines comprising a main shaft provided with a plurality of cams, an upper and a lower feed dog, a lever connected to said lower feed dog by a universal connection, a pivotally mounted rock shaft connected to said upper feed dog and levers actuated by cams upon the main shaft connected to said lower feed dog actuating lever and to said rock shaft to impart up and down and forward and backward movements to said feed dogs and means for varying the amplitude of oscillation of said feed dog actuating lever and said rock shaft including a cross head connected to one of said levers, means for guiding said cross head and means for adjusting said guiding means.

19. Feeding mechanism for sewing machines comprising a main shaft provided with a plurality of cams, an upper and a lower feed dog, a lever connected to said lower feed dog by a universal connection, a pivotally mounted rock shaft connected to said upper feed dog and levers actuated by cams upon the main shaft connected to said lower feed dog actuating lever and to said rock shaft to impart up and down and forward and backward movements to said feed dogs and means for varying the amplitude of oscillation of said feed dog actuating lever and said rock shaft including a cross head connected to one of said levers, pivotally mounted means for guiding said cross head, an arm rigidly secured to the pivot of said guiding means and means for adjusting said arm.

20. Feeding mechanism for sewing machines comprising a feed dog and means for actuating the same including a lever having a yoke provided with guideways, a rotating shaft and cam within said yoke, a cone on said shaft engaging said guideways and means on said yoke engaged by said cam whereby reciprocatory movement is imparted to said lever by said cam and oscillatory movement about the axis of the cam shaft permitted.

21. Feeding mechanism for sewing machines comprising a feed dog and means for actuating the same including a lever having a yoke provided with guideways, a rotating shaft and cam within said yoke, a cone adjustably mounted on said shaft engaging said guideways and means on said yoke engaged by said cam whereby reciprocatory movement is imparted to said lever by said cam and oscillatory movement about the axis of the cam shaft permitted.

22. In feeding mechanism for sewing machines comprising a feed dog and a feed dog actuating lever connected thereto and means for imparting a compound movement to said feed dog actuating lever, of a universal pivotal support for said lever consisting of a stud having a pair of pivotally disposed cones, a split ring having conical faces engaging the surface of said cones and means pivotally connecting said split ring and said lever.

23. In feeding mechanism for sewing machines comprising a feed dog and a feed dog actuating lever connected thereto and means for imparting a compound movement to said feed dog actuating lever, of a universal pivotal support for said lever consisting of a stud having a pair of pivotally disposed cones, a split ring having conical faces engaging the surface of said cones and means pivotally connecting said split ring and said lever consisting of oppositely disposed conically pointed screws adjustably mounted in said lever and engaging corresponding seats in the outer surface of said rings.

24. In a sewing machine having a bed plate and stitch forming mechanism, a frame pivotally supported beneath the bed plate, a feed dog pivotally mounted at one end upon a member pivotally supported upon said frame and having its opposite ends slidably mounted in ways in said frame, and means for raising and lowering and advancing and retracting said feed dog.

25. In a sewing machine having a bed plate and stitch forming mechanism, a frame pivotally supported beneath the bed plate, a yoke pivotally supported on said frame, a feed dog pivotally mounted at one end upon said yoke and having its opposite ends slidably mounted in ways in said frame said pivotal supports consisting of conical pointed screws seated in one of the relatively movable members and engaging corresponding seats in the other members, means for locking said screws in adjusted positions and means for raising and lowering and for advancing and retracting said feed dog.

26. A blind stitch sewing machine for padding comprising a work support presenting a transversely arched work supporting surface projecting above the plane of the bed plate and adapted to bend the work upwardly at the line of feed, in combination with a curved oscillating needle and complemental stitch forming mechanism located above said work support means for shogging the needle laterally to form parallel rows of stitches on opposite sides of the vertical median plane of said work support and feeding and bender mechanism for presenting the work to the stitch forming mechanism.

In testimony whereof, I have signed my name to this specification.

HARLEY C. MOULTON.